(12) United States Patent
    Doveri

(10) Patent No.: US 11,458,832 B2
(45) Date of Patent: Oct. 4, 2022

(54) MOTORCYCLE ENGINE COOLING SYSTEM

(71) Applicant: PIAGGIO & C. S.P.A, Pontedera (IT)

(72) Inventor: Stefano Doveri, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 733 days.

(21) Appl. No.: 16/347,319

(22) PCT Filed: Nov. 3, 2017

(86) PCT No.: PCT/IB2017/056864
§ 371 (c)(1),
(2) Date: May 3, 2019

(87) PCT Pub. No.: WO2018/083640
PCT Pub. Date: May 11, 2018

(65) Prior Publication Data
US 2019/0263253 A1    Aug. 29, 2019

(30) Foreign Application Priority Data

Nov. 4, 2016  (IT) .......................... 102016000111163
Nov. 4, 2016  (IT) .......................... 102016000111193

(51) Int. Cl.
*B60K 11/04*      (2006.01)
*B60R 19/52*      (2006.01)
(Continued)

(52) U.S. Cl.
CPC .............. *B60K 11/04* (2013.01); *B60K 11/08* (2013.01); *B60R 19/52* (2013.01); *B62K 11/04* (2013.01);
(Continued)

(58) Field of Classification Search
CPC ......... B60K 11/04; B60K 11/08; B62K 11/04; B60R 19/52; F01P 3/18; F01P 5/02; F01P 11/0209
See application file for complete search history.

(56) References Cited

U.S. PATENT DOCUMENTS 6,971,438 B2    12/2005  Oki et al.
7,784,586 B2 *   8/2010  Ozeki .................... B60K 6/543
                                                       181/227
(Continued)

FOREIGN PATENT DOCUMENTS

DE         2035463 A1   7/1970
DE    102008027454 A1   1/2009
(Continued)

*Primary Examiner* — Tony H Winner
*Assistant Examiner* — Michael R Stabley
(74) *Attorney, Agent, or Firm* — McGlew and Tuttle, P.C.

(57) ABSTRACT

A cooling system of an internal combustion engine of a motorcycle, which has a suction side guard (4), enables a high ratio between the open surface of the guard and its overall surface, ensuring an improved penetration of the air through the radiator and thus avoiding oversizing of the suction fan, wherein: said guard (4), having a lower edge (6), an upper edge (7), a front edge (8) and a rear edge (9) with respect to a running direction (F) of the vehicle, has a grate mesh structure extending on a plane whereby a deviation space (12) of motion of the air sucked by the fan is defined behind the guard (4); said grate mesh structure being surrounded by a rib (13) having, at the front edge (8), a lower height than that at the rear edge (9).

18 Claims, 4 Drawing Sheets

(51) Int. Cl.
*F01P 3/18* (2006.01)
*F01P 5/02* (2006.01)
*F01P 11/02* (2006.01)
*B60K 11/08* (2006.01)
*B62K 11/04* (2006.01)

(52) U.S. Cl.
CPC .................... *F01P 3/18* (2013.01);
*F01P 5/02* (2013.01); *F01P 11/0209*
(2013.01); *B60Y 2200/126* (2013.01)

(56) References Cited

U.S. PATENT DOCUMENTS

| | | | |
|---|---|---|---|
| 8,671,892 B2 * | 3/2014 | Yamanishi | B60K 11/04 123/41.01 |
| 2009/0001736 A1 | 1/2009 | Makino | |
| 2014/0034267 A1 * | 2/2014 | Hojo | B60H 1/00457 165/51 |

FOREIGN PATENT DOCUMENTS

| | | |
|---|---|---|
| EP | 2 022 658 A1 | 2/2009 |
| EP | 2 055 624 A2 | 5/2009 |
| EP | 2 474 723 A1 | 7/2012 |
| EP | 2848507 A1 | 6/2014 |
| JP | 2007 315744 A | 12/2007 |
| JP | 2014 084844 A | 5/2014 |
| TW | 200712313 A | 4/2007 |
| TW | 201504083 A | 2/2015 |
| WO | 2009/017749 A1 | 2/2009 |

* cited by examiner

MOTORCYCLE ENGINE COOLING SYSTEM

The present invention is referred to a cooling system of an internal combustion engine of a motorcycle, in particular a scooter, wherein a cooling fan and a guard disposed on a side of the motorcycle are provided, receiving a substantially tangential air flow resulting from the forward motion of the vehicle, aspirated by said fan through the guard itself.

In particular, the fan can be directly keyed on an extension of the engine drive crankshaft, or it can be driven by the drive crankshaft by means of a kinematic connection with a belt or a pinion.

Although its use is not limited to this example, the cooling system may also be effectively used in engines of water-cooled motorcycles wherein, on the drive crankshaft, are keyed both the fan, apt to suck air through a radiator, and an electric motor-generator charging an electric battery when the internal combustion engine is switched on and, if required, providing driving power, when the motorcycle is of the so-called hybrid propulsion kind.

The internal combustion engine axis is transversal to the longitudinal development of the motorcycle, thus it is horizontally placed with respect to a running surface and it is perpendicular to a vertical plane substantially defined by the rotation plane of the unmovable rear wheel, i.e. non-steering, when the motorcycle is running along a straight line. Electric motor, fan, radiator and relative guard are then received on the same side of the engine, for example the right side opposite to the side of the transmission of the vehicle, at one end of the motor crankshaft which is driven in rotation by one or more pistons; the opposite end of the engine crankshaft being therefore connected to the transmission members of the motion to the driving rear wheel. In the motorcycle, it could also be provided a double front wheel and/or rear in a solution that is not described here, but which may include the cooling system described herein.

The positioning of the radiator guard as described above makes it is not frontally struck by the air flow but tangentially. The cooling air required for the cooling water radiator is then sucked by a fan whose axis is substantially perpendicular to the airflow defined by the forward motion of the motorcycle.

Considering that the fan rotation regime could not directly from cooling demands, as usually takes place in a car engine where the fan is driven by a dedicated electric motor, but is identical to the engine rotation speed, the prevalence of the fan must be appropriately designed thereby the radiator could always be satisfactorily cooled.

This need could therefore result in an oversizing of the fan blades which, on the one hand, could over-increase the transverse size of the cooling system with respect to the motorcycle and, on the other hand, it could decrease the overall engine output, since a larger part of driving power, especially at high speeds, would be spent the motion of the fan.

On the other hand, if the guard have of a wide mesh pattern, two other drawbacks would raise: on one hand impurities and dirt could not be filtered out of the guard and could clog the radiator, and on the other hand the outer surface of the radiator, which has metallic blades, would be visible so causing an anti-aesthetic effect.

The visibility of the radiator would increase by using inclined slats leaving an unobstructed view thereof, when looking at the guard from directions not perpendicular to it, in particular from above and from the sides.

U.S. Pat. No. 6,971,438 A discloses a cooling system as outlined above, wherein the guard is substantially parallel to the radiator, in a configuration in which the drawback mentioned above could occur.

In the light of this need, European Patent Application No. 2,474,723 A1 discloses a cooling system wherein the guard is inclined so that the transverse projection thereof having an increased size is facing the direction of motion, whereby partially intercepting the air flow determined by the motorcycle motion.

However, this arrangement could reduce the aerodynamic efficiency of the vehicle and, in fact, the guard has transverse slats arranged to form a flat surface on the guard, to stop the passage of the air, also to prevent dirt, water or dust penetrating the guard, inside of the radiator compartment closed by the same guard.

In addition, the positioning of the radiator guard described above makes it predisposed for a dual purpose: on one hand it must prevent the radiator from being contaminated with debris and particulate sucked by the fan along with the air flow, and on the other hand, it must hide the view of the radiator as it is not an aesthetically pleasing component to be observed.

With respect to the latter aspect, it should be noted that the radiator, and hence the guard, are arranged at the bottom of the vehicle and they are thus observed by a person near the vehicle and thus able to observe details, from top to bottom.

In this connection, it is hence desirable that the guard, in addition to performing its main screen task without introducing into the system excessive power losses, produce the greatest possible covering effect to conceal what it covers, i.e. the radiator in the case of water cooled motors, or other propulsion unit organs or the same fan.

In the art, many examples of motorcycle radiator guards are known, which have a substantially slatted structure.

European Patent Applications No. 2,022,658 A1 and No. 2,055,624 A2 instead disclose a cooling system of the kind described above, wherein the guard is separated into two portions by a vertical rib, raised with respect to the front and rear edges of the guard. In this way, under the guard it is formed an empty space where the air has the possibility to change direction due to the force of the suction fan, and a part of the guard has one of its transverse projection facing in the direction of motion, to partially intercept the airflow from the motorcycle motion.

Even in this case, however, there may be both aerodynamic problems and the risk that dirt or dust may infiltrate the radiator area under the protection guard.

The technical problem which is underlying the present invention is to provide a cooling system for an internal combustion engine of a motorcycle allowing to overcome the drawbacks mentioned with reference to the prior art.

This problem is solved by a cooling system as specified above and as defined by the annexed claim 1. The present invention also relates to a motorcycle that includes such a cooling system.

The main advantage of the cooling system according to the present invention lies in allowing a high ratio between the open surface of the guard and its overall surface, ensuring an improved penetration of air through the guard and thus avoiding oversizing of the fan.

It should also be noted that it is desirable that the guard, in addition to fulfilling its main task as screen without introducing into the system an excessive pressure loss, produces a maximum covering effect to possibly hide the sight of what it covers, namely the radiator in the case of engines water cooled, or other organs of the propulsion unit or the fan itself.

As already seen, many examples of guard for motorcycles radiators are known, which have a substantially louver structure. The visibility of the radiator increases with the use of tilted slats that leave the view free while looking at the guard from non-perpendicular directions, particularly from the top and the sides.

Therefore, the guard included in the cooling system that will be described below permits an effective shielding of the portion of propulsion unit covered by the guard itself as seen from directions not perpendicular to it, in particular from the top downwards.

The present invention will be described hereinafter according to a preferred embodiment thereof, provided for exemplifying and not limiting purposes with reference to the accompanying drawings wherein.

Figure 4:
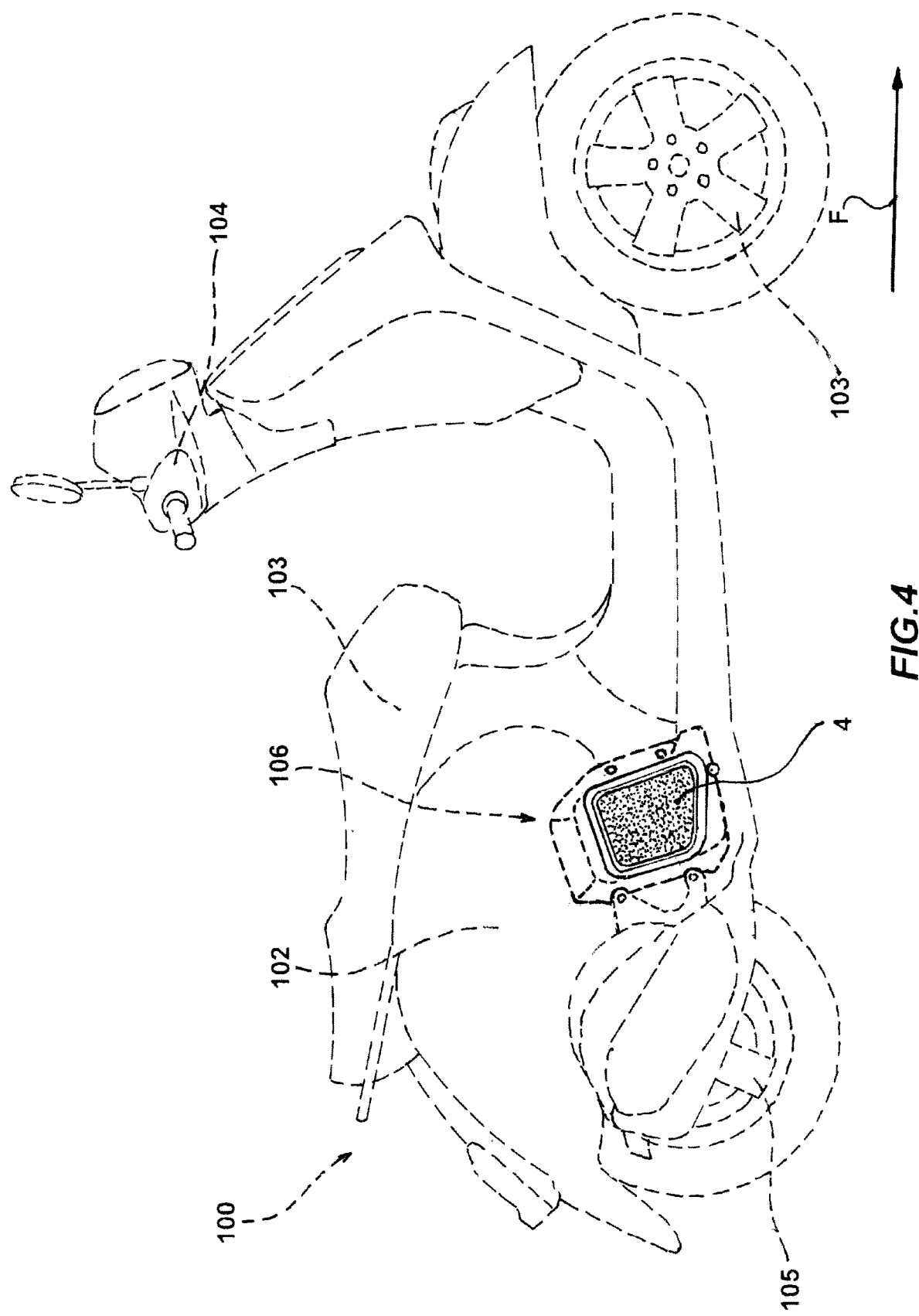
FIG. 4 shows a side view of a motorcycle, in particular a scooter, incorporating the propulsion unit of FIG. 1 with the guard of the preceding figures.

With reference to FIG. 4, a motorcycle, and in particular a scooter, is indicated in its entirety with 100. The invention relates to the field of saddle-vehicles in general, with two, three or four wheels, with particular reference to the scooter having a propulsion unit disposed under a saddle 101, inside a chassis 102 which is here laterally shown, extending from a front wheel 103 steered by a handlebar 104 to a driving rear wheel 105.

The propulsion unit 106 is of the type having one or more cylinders arranged in an inclined position roughly in the median plane of the vehicle which corresponds to the plane of rotation of the two wheels during straight forward motion. In the figures is shown a forward direction F of the vehicle 100 corresponding to the forward motion thereof.

The propulsion unit motor has a single engine block which, in this embodiment, accommodates a cylinder and a relative piston.

The piston acting in said cylinder is connected to an engine crankshaft positioned transversely and perpendicular to said median plane. On one side not shown of the scooter 100, there are provided motion transmission devices from the crankshaft to the rear wheel shaft 105.

On the shown side, the scooter 100 has a cooling system, indicated as a whole with 1 (FIG. 1) of the propulsion unit which in turn includes the internal combustion engine which may be of the air-cooled or water-cooled type, water-cooled in the present embodiment, wherein a cooling fan is driven by the crankshaft facing a radiator protected by a guard arranged on one side of the motorcycle and receiving a substantially tangential air flow from the motorcycle forward motion.

In the present example of cooling system, a cooling fan (not shown) is directly keyed to the crankshaft, facing a radiator 3 which is protected by a guard 4 which receives a substantially tangential air flow deriving from the forward motion of the motorcycle.

The direct keying of fan produce a particular case of fan which is driven in rotation by the crankshaft, with a regime not independent from the engine rotation speed itself.

In particular, in the present embodiment, on said crankshaft both the fan, providing to draw air through the radiator 3, and an electric motor-generator (not shown), providing the charging of an electric battery, switching on the internal combustion engine and, where appropriate, to deliver driving power when the motorcycle is of the type with so-called hybrid propulsion.

Electric motor, fan, radiator and relative guard are then arranged at one end of the crankshaft, at the same side of the engine; the opposite end of the motor shaft is therefore connected to the members of the previously mentioned transmission.

The radiator 3 has a box-like structure between two parallel planes and the median plane of the vehicle, and the fan is also lying and rotating on a plane substantially parallel thereto, so that the intake air stream must be deviated by about 90° compared to the tangential flow that the vehicle produces as a result of the forward motion thereof.

Figure 1:
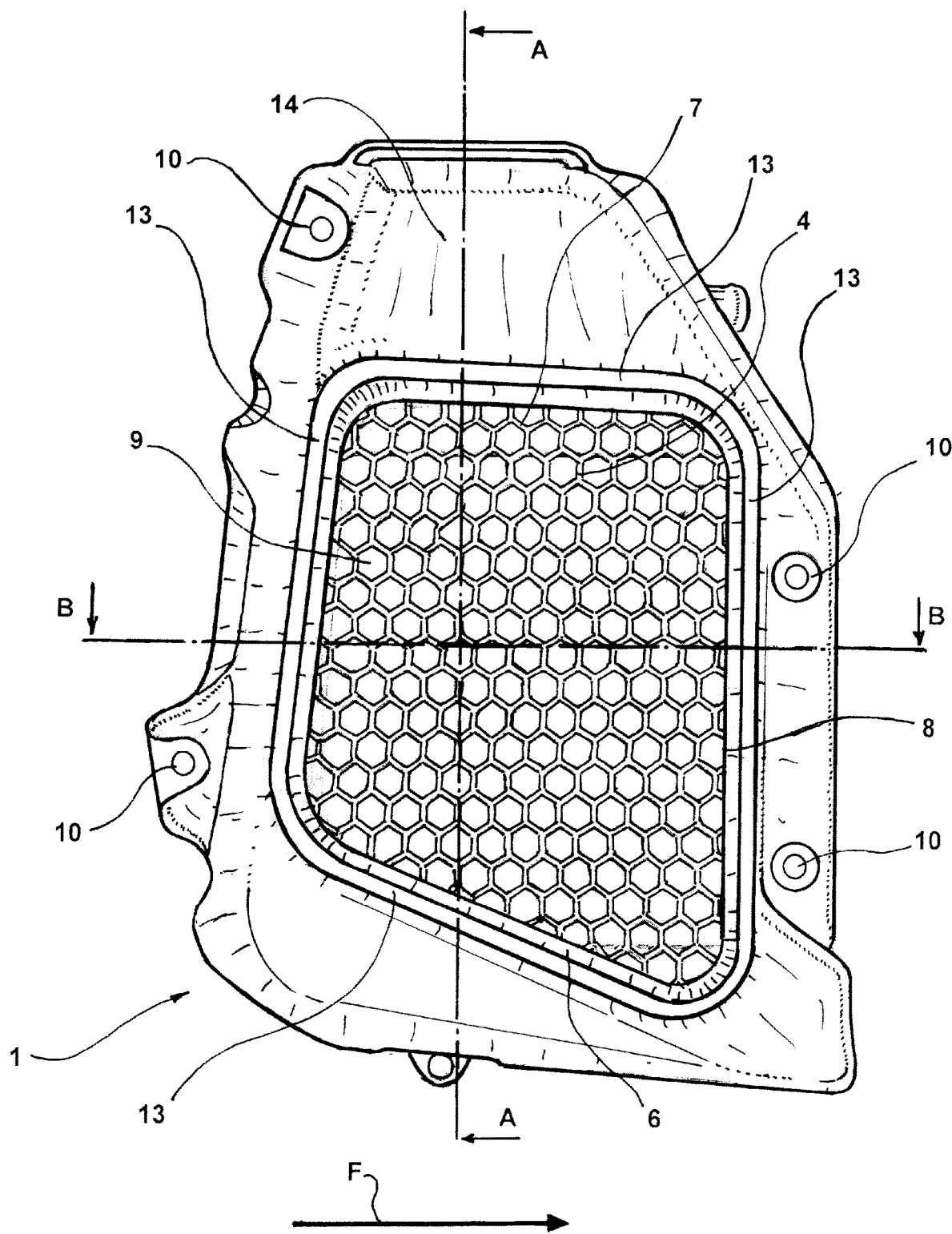
FIG. 1 shows a side view of a propulsion unit of a motorcycle, limited to the engine cooling system thereof, according to the present invention.

The fan is encased in a casing 5, which is arranged between the radiator 3 and the electric motor: this casing has a large central opening corresponding to the radiator face 3 opposite to that facing towards the guard 4 (FIG. 1). It also comprises side walls that define a suction channel which is interrupted at a gap having a plurality of fins 20 and which realizes the output of radial air discharge, being the fan of centrifugal kind.

It should be noted that what outlined above may be related to both a scooter with a front steering wheel and an unmovable rear wheel as well as a three-wheel scooter with a pair of tilting front wheels and an unmovable rear wheel. However, in the motorcycle it may also be provided a double rear wheel in a solution that is not described here but which may include the cooling system described herein.

Focusing on the cooling system, said guard 4 has a lower retaining edge 6, a top fastening edge 7, a front fixing edge 8 and a fastening rear edge 9; they have respective fixing holes 10 intended to be engaged by screws. The above mentioned edges are bent to form, with the exposed face of the guard, an open container which is assembled at the radiator 3, to which the concavity of the guard 4 is oriented.

In the present description, front, rear, bottom and top are terms that refer to the location of the edges with respect to the vehicle, i.e. with respect to said forward direction F.

In the cooling system according to the invention, the guard 4 comprises a grate mesh structure, regularly distributed according to a predetermined pattern. In the present embodiment, this pattern is of the honeycomb kind, which is composed of a pattern of regular hexagons, with opposite vertices facing downwards and upwards and parallel sides disposed to the right and to the left of each hexagon, which fully fill the guard surface.

It is understood that hexagons could be rotated by 90° rather than what is described, or they have yet another different inclination; they may be irregular or, in particular, flattened in the direction of height to decrease the height of each mesh.

In addition, hexagons could be replaced by several geometric shapes (squares, diamonds, etc.).

The aforementioned grate meshes are defined by a grate provided in a single piece, with bars 11 of the grate having a uniform cross section, with a rounded outer face.

These guard bars 11 have a determined thickness, having a determined thickness, whereby the radiator view from tilted angles is obstructed. In particular, the thickness is greater than 1.5 mm, preferably greater than 2 mm.

The honeycomb grate mesh structure also has a ratio between the total surface thereof and the perforated surface thereof is from 1.8 mm to 1.2 mm, preferably from 1.65 mm to 1.4 mm.

In addition, the distance between two opposite and facing sides of the hexagon is between 7 and 12 mm.

Figure 4A:
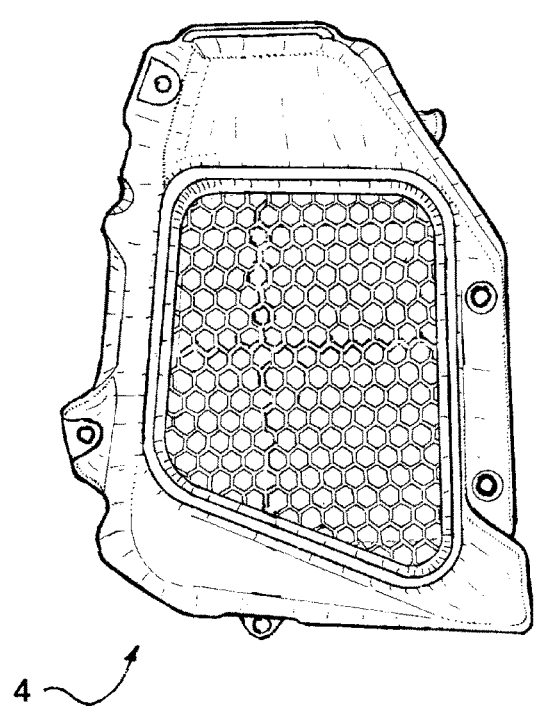
FIGS. 4A and 4B show frontally two different embodiments of the guard of the cooling system according to the invention, with a respective magnification of their mesh pattern.
Figure 4A:
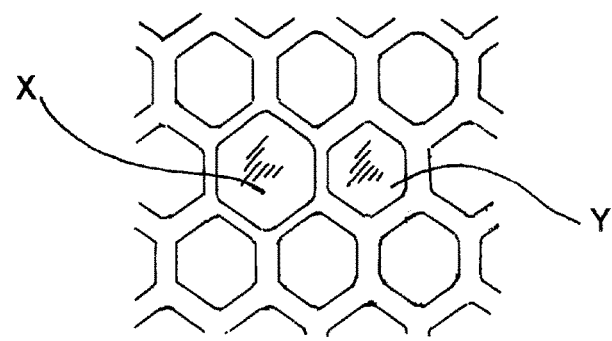
Figure 4B:
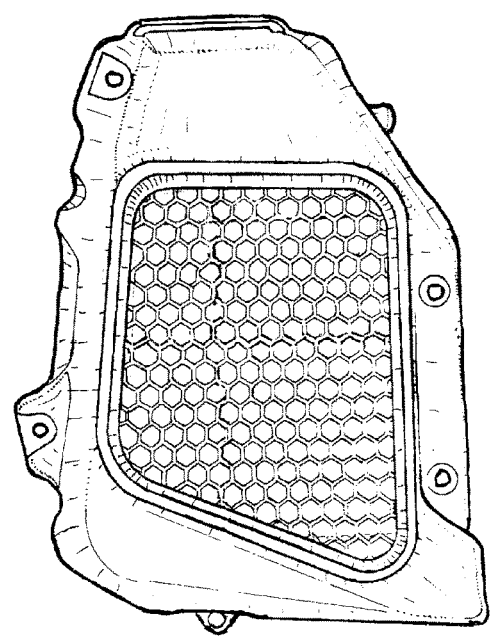
Figure 4B:
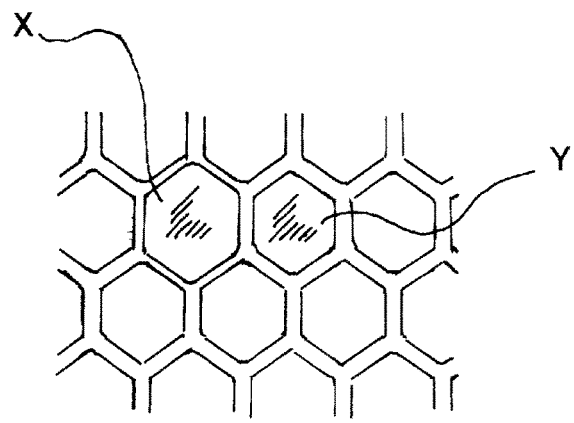

Referring to FIGS. 4A and 4B, two different versions of honeycomb grate are shown.

In the first version (FIG. 4A), each mesh has an overall surface X of 89.2 mm$^2$, while the effective passage area Y is 54.8 mm$^2$. This results in a ratio between the overall surface and perforated surface of the grate X/Y of 1.63. The key of each hexagon, i.e. the distance between two opposing sides of the hexagon is 8.0 mm.

The covering effect of this guard is also determined by its thickness which is, in this version, 2.25 mm.

In the second version (FIG. 4B), each mesh has a total area X of 156.6 mm$^2$, while the actual air passage area Y is 109.4 mm$^2$. This results in a ratio between the total surface and the perforated surface of the grate of 1.43. The key of each hexagon, i.e. the distance between two opposite and facing sides of the hexagon is 11.5 mm.

The covering effect of this guard is also determined by its thickness which is, as in the previous version, 2.25 mm.

The main advantage of the cooling system according to the present invention lies in allowing an effective shielding of the portion of propulsion unit covered by the guard itself, looking from its non-perpendicular directions, particularly from the top to the bottom.

The guard 4 extends on a tilted plane in such a way that the front edge 8 is lowered with respect to the rear edge 9, so as to determine between the grill and the radiator a deviation space 12 wherein the air flow sucked by the fan is deflected of about 90°.

This deviation space is delimited by walls 16 projecting internally from the guard 4 and connected with the radiator 4, so that the deviation space 12 is closed by it and the air is thus forced to pass through the radiator 4.

Figure 3:
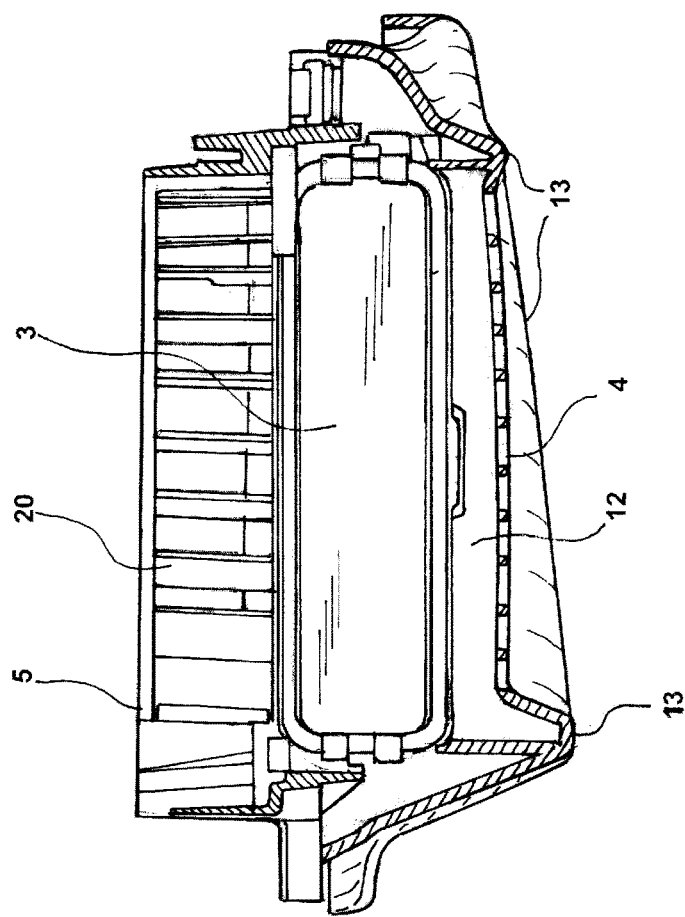
FIG. 3 shows a section view of the assembly guard-radiator-fan box, according to the horizontal plane B-B of FIG. 1.
Figure 2:
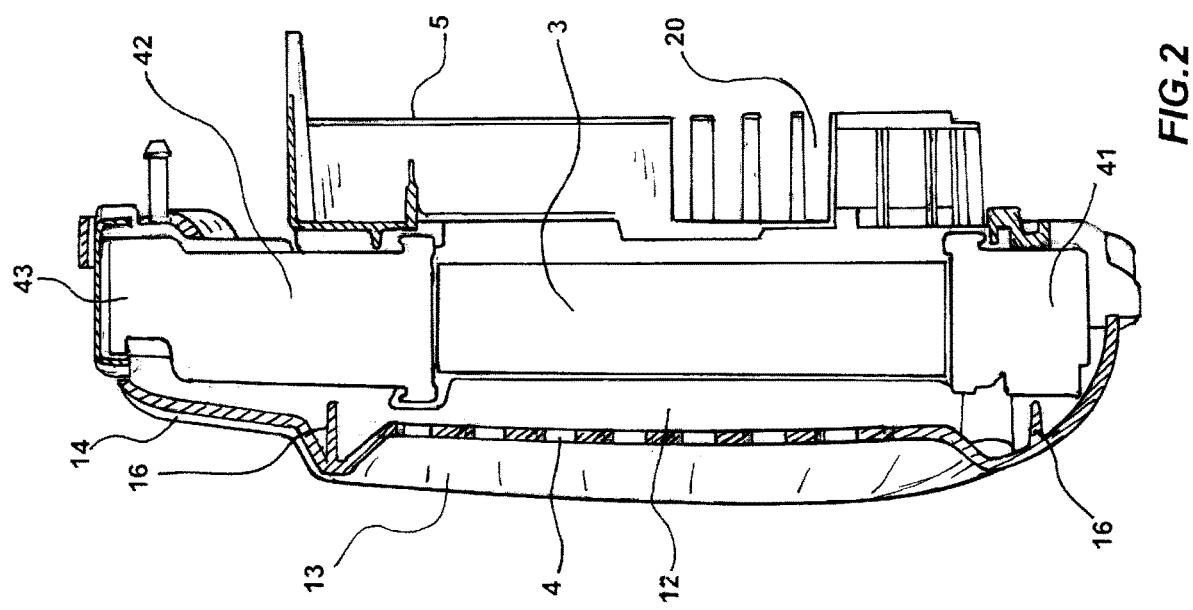
FIG. 2 shows a section view of the assembly guard-radiator-fan box, according to the vertical plane A-A of FIG. 1.

In addition, as shown in FIG. 3, the guard 4 is surrounded by a rib 13 having, at the front edge 8, a height $H_1$ less than a height $H_2$ in correspondence with the rear edge 9. The heights $H_1$ and $H_2$ are measured with respect to the grate plane. However, the height of the rib in correspondence of the front edge 8 exceeds the plane on which extends the guard 4. This rib 13 deflects dirt and impurities that may be raised by the front wheel of the motorcycle or by other vehicles that move in front of the motorcycle.

Note that the grate plan is defined by the guard mesh structure 4, structure which is then planar, parallel to the forward direction F, and those heights are measured with respect to the outer surface of this plan.

In particular, as best shown in FIG. 3, the rear edge creates an obstacle to air flow. The flow hits the rear edge higher and create a countercurrent flow, which generates a turbulence effect capable of increasing the intake of air that enters through the guard.

In this way, on the surface of the grate, a limited area of calm is created from which dirt and impurities are not present, from which air is sucked.

The radiator 3 has a lower manifold 41, which substantially corresponds to said lower clamping edge 6, and a top collector 42 provided with a plug 43.

In the present example, the guard 4 has a closed top portion 14 which overlaps the upper manifold 42 and the cap 43 of the radiator 3 hiding it completely.

This arrangement prevents accidental opening of the cap 43, as well as any break-in, and prevents that these parts, which are made of metal and they have a high operating temperature, scorch driver or passenger.

As noted above, the radiator 3 has a box shape having a surface exposed to the air flow directed through said guard 4, the surface being substantially vertical and inclined with respect to the forward direction F of the motorcycle.

To the above described cooling system a person skilled in the art, in order to satisfy further and contingent needs, may carry out several further modifications and variants, all however comprised within the scope of protection of the present invention, as defined by the appended claims.

The invention claimed is:

1. A cooling system of an internal combustion engine of a motorcycle, the cooling system comprising:
    a guard, arranged on a side of the motorcycle and receiving a substantially tangential air flow, deriving from a forward motion of the motorcycle, sucked by a fan, said guard comprising a lower edge, an upper edge, a front edge and a rear edge with respect to a forward running direction of the motorcycle, said guard further comprising a grate mesh structure extending on a plane to determine, behind the guard, a deviation space in which the tangential air flow sucked by the fan through the guard is deviated, said grate mesh structure of the guard being surrounded by a rib, the rib having a height at the front edge that is lower than a height thereof at the rear edge, said height being measured with respect to the plane of a grate, wherein grate meshes are formed in a grate provided in a single piece, with bars of the grate having a uniform cross section, with an outer face rounded, said bars having a determined thickness, whereby a radiator view from tilted angles is obstructed.

2. A cooling system according to claim 1, wherein said grate mesh structure is a honeycomb-like structure.

3. A cooling system according to claim 2, wherein said honeycomb-like structure has a ratio between a total surface thereof and a perforated surface thereof, the ratio being from 1.8 to 1.2, and the honeycomb-like structure has a thickness greater than or equal to 1.5 mm.

4. A cooling system according to claim 3, wherein the honeycomb-like structure comprises a regular hexagon pattern, with opposite vertices facing downward and upward, and parallel sides arranged to right and left of each hexagon, which completely fill a grate surface.

5. A cooling system according to claim 1, wherein said determined thickness is greater than 2.0 mm.

6. A cooling system according to claim 1, wherein a ratio between a grate total surface and a grate perforated surface thereof is from 1.65 to 1.4.

7. A cooling system according to claim 1, wherein said guard extends on a tilted plane such that the front edge is lowered with respect to the rear edge.

8. A cooling system according to claim 7, wherein the deviation space is delimited by walls protruding internally from the guard and the walls are connected with a radiator, whereby the space deviation is thereby closed, and the air is forced to pass through the radiator, wherein the height of the rib at the front edge stands out of a plane on which the guard extends.

9. A cooling system according to claim 1, wherein the cooling system is operated with water circulating in a radiator interposed between the guard and the fan on a plane parallel to development of the radiator, the deviation space being formed between the guard and the radiator.

10. A cooling system according to claim 9, wherein the deviation space is delimited by walls protruding internally from the guard and the walls are connected with the radiator, whereby the space deviation is thereby closed, and the air is forced to pass through the radiator.

11. A cooling system according to claim 9, wherein the radiator has a top manifold provided with a cap, the guard having a top covering portion which overlaps the top manifold and the cap, hiding the top manifold and the cap completely.

12. A cooling system according to claim 1, wherein the fan is enclosed in a casing having a central opening that corresponds to an opposite face of the radiator with respect to the guard.

13. A cooling system as claimed in claim 1, wherein the fan is directly keyed on an extension of a motor shaft.

14. A motorcycle, comprising:
- a drive unit disposed beneath a saddle, inside a chassis extending from at least one front wheel, steered by a handlebar to at least one rear wheel defining a forward motion direction which corresponds to the forward motion of the vehicle; and
- a cooling system comprising a guard arranged on a side of the motorcycle and the guard receiving a substantially tangential air flow, resulting from the forward motion of the motorcycle, sucked by a fan, said guard having a lower edge, an upper edge, a front edge and a rear edge with respect to the forward motion direction of the motorcycle, the guard comprising a grate mesh structure extending on a plane to determine, behind the guard, a deviation space in which the air flow sucked by the fan through the guard is deviated, the grate mesh structure of the guard being surrounded by a rib having a lower height at the front edge than a height thereof at the rear edge, the height being measured with respect to the plane of a grate, wherein grate meshes are formed in a grate provided in a single piece, with bars of the grate having a uniform cross section, with an outer face rounded, said bars having a determined thickness, whereby a radiator view from tilted angles is obstructed.

15. A motorcycle according to claim 14, wherein said grate mesh structure is a honeycomb-like structure.

16. A motorcycle according to claim 15, wherein said honeycomb-like structure has a ratio between a total surface thereof and a perforated surface thereof, the ratio being from 1.2 to 1.8, and the honeycomb-like structure has a thickness greater than or equal to 1.5 mm.

17. A motorcycle according to claim 16, wherein the honeycomb-like structure comprises a regular hexagon pattern, with opposite vertices facing downward and upward, and parallel sides arranged to right and left of each hexagon, which completely fill a grate surface.

18. A motorcycle according to claim 14, wherein said determined thickness is greater than 2.0 mm.

\* \* \* \* \*